United States Patent [19]

Reinartz et al.

[11] Patent Number: 5,503,184
[45] Date of Patent: Apr. 2, 1996

[54] PRESSURE CONTROL VALVE

[75] Inventors: Hans-Dieter Reinartz, Frankfurt am Main; Peter Volz, Darmstadt; Erhard Beck, Weilburg, all of Germany

[73] Assignee: ITT Automotive Europe GmbH, Germany

[21] Appl. No.: 244,001

[22] PCT Filed: Oct. 30, 1992

[86] PCT No.: PCT/EP92/02492

§ 371 Date: May 11, 1994

§ 102(e) Date: May 11, 1994

[87] PCT Pub. No.: WO93/09982

PCT Pub. Date: May 7, 1993

[30] Foreign Application Priority Data

Nov. 12, 1991 [DE] Germany ............ 41 37 123.2

[51] Int. Cl.⁶ .......... F16K 47/00; F16K 41/00; F16K 31/06; F16K 1/14
[52] U.S. Cl. ............ 137/625.3; 137/625.37; 251/129.02; 251/129.07; 251/129.08; 303/119.2
[58] Field of Search ............ 137/625.3, 625.37; 251/118, 129.02, 129.07, 129.08; 303/119.2

[56] References Cited

U.S. PATENT DOCUMENTS

| | | | |
|---|---|---|---|
| 2,615,671 | 10/1952 | Landon ............ | 137/625.3 X |
| 3,521,853 | 7/1970 | Gillis et al. . | |
| 3,684,238 | 8/1972 | Michellone et al. ............ | 251/129.07 |
| 3,704,726 | 12/1972 | Lewis ............ | 137/625.3 |
| 3,811,465 | 5/1974 | Abbey . | |
| 4,108,210 | 8/1978 | Luthe et al. . | |
| 4,643,227 | 2/1987 | Suzuki et al. ............ | 251/118 X |
| 4,762,146 | 8/1988 | Ewbank et al. . | |
| 4,892,118 | 1/1990 | Davis et al. ............ | 137/625.37 X |
| 5,050,642 | 9/1991 | Bright ............ | 251/129.07 X |
| 5,076,538 | 12/1991 | Mohr et al. ............ | 251/129.02 X |

FOREIGN PATENT DOCUMENTS

| | | |
|---|---|---|
| 0317304 | 5/1989 | European Pat. Off. . |
| 0391332 | 10/1990 | European Pat. Off. . |
| WO9104181 | 4/1991 | European Pat. Off. . |
| 1107471 | 5/1961 | Germany . |
| 2064562 | 7/1971 | Germany . |
| 2135047 | 1/1973 | Germany . |
| 2846294 | 10/1979 | Germany . |
| 3122221 | 2/1982 | Germany . |
| 2248486 | 10/1985 | Germany . |
| 3610636 | 10/1986 | Germany . |
| 3744730 | 4/1989 | Germany ............ 251/118 |
| 3506287 | 7/1990 | Germany . |
| 293782 | 9/1991 | Germany . |
| 4016754 | 11/1991 | Germany . |
| 476246 | 9/1969 | Switzerland . |

OTHER PUBLICATIONS

PCT Publication No. WO92/13741 published 20 Aug. 1992.
PCT Publication No. WO92/04214 published 19 Mar. 1992.

*Primary Examiner*—Gerald A. Michalsky
*Attorney, Agent, or Firm*—Dykema Gossett

[57] ABSTRACT

A pressure control valve with a valve-closing member which is axially movably guided within a valve housing and which is capable of adjusting a passage between a first pressure agent connection and at least one second pressure agent connection depending on its position being variable in respect of a valve seat, pressure agent transition ducts to be shut off or opened up directly one after the other by the valve-closing member being positioned between the first and the second pressure agent connections for the reduction of the noise of the valve, which said pressure agent transition ducts form a variable cross-sectional area of the valve opening.

9 Claims, 2 Drawing Sheets

5,503,184

PRESSURE CONTROL VALVE

TECHNICAL FIELD

The invention relates to pressure control valves, and in particular to electromagnetic valves for slip-controlled brake units for automotive vehicles.

BACKGROUND OF THE INVENTION

In the German patent application No. 41 03 365.5 a pressure control valve being controllable by an electromagnet is described whose tappet-shaped valve-closing member controls the passage between a first pressure agent connection and a second pressure agent connection in the range of a funnel-shaped valve seat surface depending on the stroke. For safeguarding, a pressure-balanced valve actuation and a pressure balancing duct connect the magnet armature chamber (being shielded) by means of a packing seal.

The prior-art valve design generates much noise during the impulse like valve switching phases. This noise is primarily caused by the valve-closing member striking against the valve seat and by the nonsteady flow attitude and, thus, the discontinuous flow around the valve-closing member on account of the binary valve switching positions.

It is, therefore, the object of the invention to improve a pressure control valve of the prior art so that the noise problems are overcome while simultaneously guaranteeing reliable operation and a comparatively simple-design structure.

In accordance with the present invention, the pressure agent transition ducts (to be shut off or to be opened up directly one after the other by the valve-closing member) are positioned between the first and the second pressure agent connections. The pressure agent transition ducts have a cross-sectional area of the valve opening which is variable by steps.

DETAILED DESCRIPTION OF THE PREFERRED EMBODIMENTS

Figure 1:
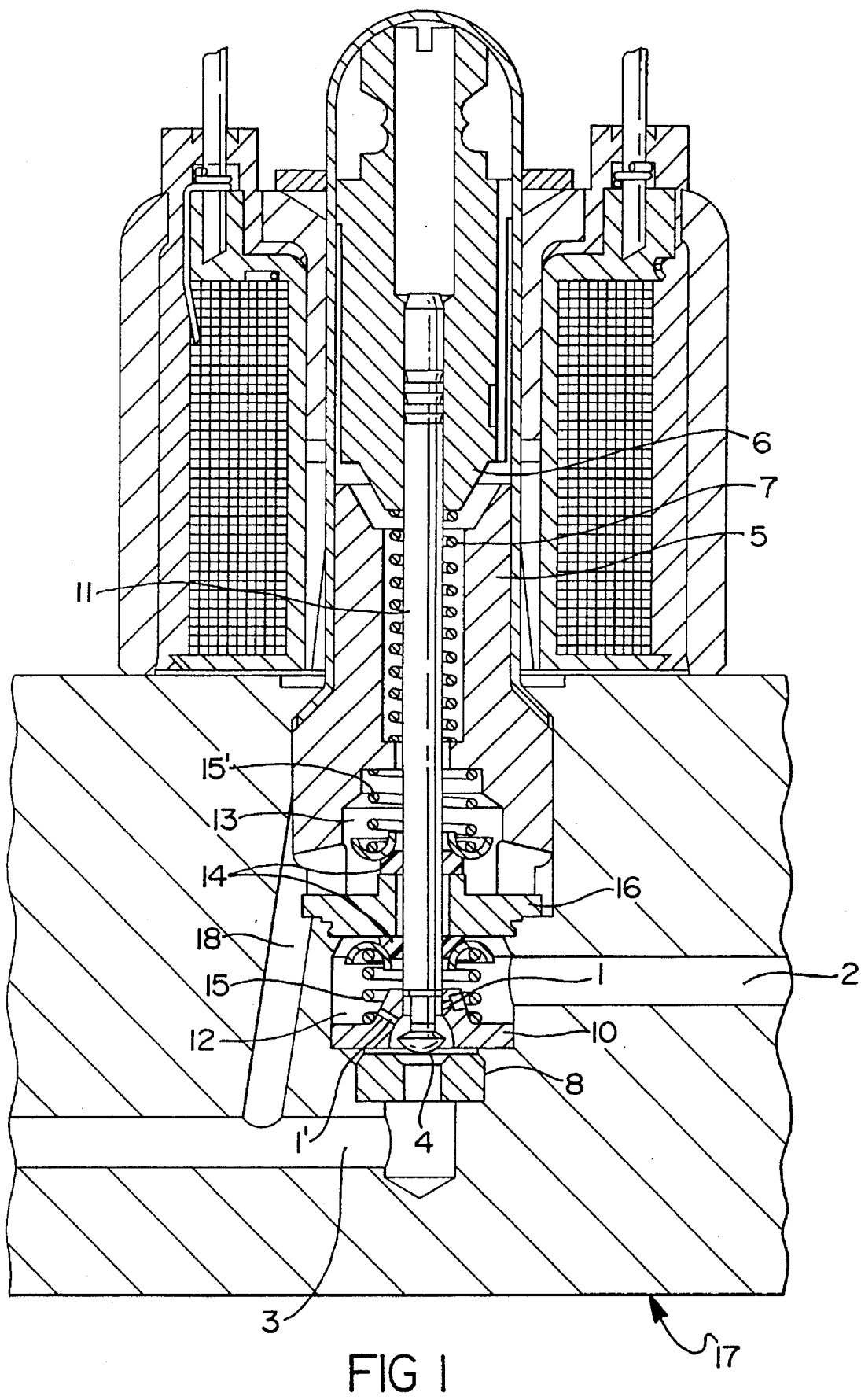
FIG. 1 shows a cross sectional view of the electromagnetically actuatable pressure control valve of the present invention with pressure agent transition ducts positioned in the valve seat element.

FIG. 1 shows a valve tappet 11 which in the electromagnetically de-energized normal position is switched to permanent pressure agent passage, which is furnished with a valve-closing member 4 and which controls the pressure agent connection between a pressure agent source, for example, coming from a brake pressure master unit, through a first pressure agent connection 2, and the consumer-side second pressure agent connection 3 being, for example, connected on the side of the wheel brake.

A second pressure chamber 12 connecting the first to the second pressure agent connection 2, 3 accommodates a sealing element 14 which seals off the valve tappet 11 with respect to a first pressure chamber 13. The sealing element 14 is retained at a front surface of a guide element 16 by means of a compression spring 15 which is positioned within the second pressure chamber 12. The guide element 16 being retained by means of caulking between the offset opening within the valve housing 17. The magnet core 5 preferably has a disc-shaped configuration whose bore being disposed coaxially is penetrated with play by the valve tappet 11.

In the section of said magnet core 5 facing the guide element 16 there is a stepped bore for the accommodation of a second spring 15' which positions a sealing element 14 on the opposite front surface of the guide element 16, (analogous to the first spring 15). In this way it is guaranteed that notwithstanding a fit dimensioned with a relatively abundant play between the valve tappet 11 and the bore of the guide element 16 a sufficient sealing effect between the first pressure chamber and the second pressure chamber comes about.

In this configuration, the first pressure chamber 13 facing the magnet core 5 extends along the valve tappet 11 into the cavity of the valve dome. A permanent pressure compensation between the consumer-side second pressure agent connection 3 and the first pressure chamber 13 takes place through corresponding, transversely extending recesses at the front surface of the magnet core 5 which contacts the guide element 16 and through a ring-shaped recess within the valve housing 17 which connects the first pressure chamber 13 to a by-pass duct 18. The sealing elements preferably consist of polytetrafluoroethylene or of a comparable material.

For the autocentration of the valve tappet 11 with respect to the valve seat 8, the sealing elements 14 can move (or slide) in a radial direction, on the front surface of the guide element 16. This free mobility is fostered, among others, by the directional elasticity free of transverse force of the compression spring 15. The sealing elements 14 are designed such as to be self-sealing under the action of the hydraulic pressure, so that a perfect hydraulic tightness and but minimum frictional forces come about already by comparatively low spring forces. Because of the extraordinarily low frictional forces, distinctly favorable conditions are present for promoting sliding movement in radial direction. This results in the desired autocentration. The mushroom-shaped valve-closing member 4 is guided within a truncated cone-shaped valve-supporting element 10. The valve-supporting element 10, thus, performs simultaneously the function of a centering device, for which purpose said valve-supporting element 10 is aligned and preferably retained by caulking in a concentrical position with respect to the valve tappet 11 and to the funnel-shaped valve seat 8 in the valve housing 17.

The circumferential surface of the valve supporting element 10 is penetrated by a plurality of pressure agent transition ducts 1, 1' provided with an orifice bore. Ducts 1, 1' are shut one after the other by the stepped stem of the valve-closing member 4 depending on the stroke. The step-shaped offset of said valve-closing element 4 performs the function of a restrictor. The original passage being determined by the opening area of the valve seat will, thus, allow to be controlled in cascade, so that a continuous, switchable flow of pressure agent will be brought about depending on the pressure agent transition ducts 1, 1' being released by the valve tappet 11. In this context, the proportional characteristic of the electromagnet caused by the conical front faces at the magnet armature and at the magnet core proves particularly advantageous. This affords a precise control of the valve tappet stroke and, thus, of the pressure agent passages depending on a variably adjustable armature current. On one hand, the control quality will be increased in this way in the sense of a pressure course allowing to be precisely influenced in the desired manner and, on the other hand, the pressure-balanced design of the valve will contribute to minimizing the actuating forces and, consequently, the armature current. Beyond this, a relatively simple control technique relation results between the armature current and the area of the passage to be released by steps.

Figure 2:
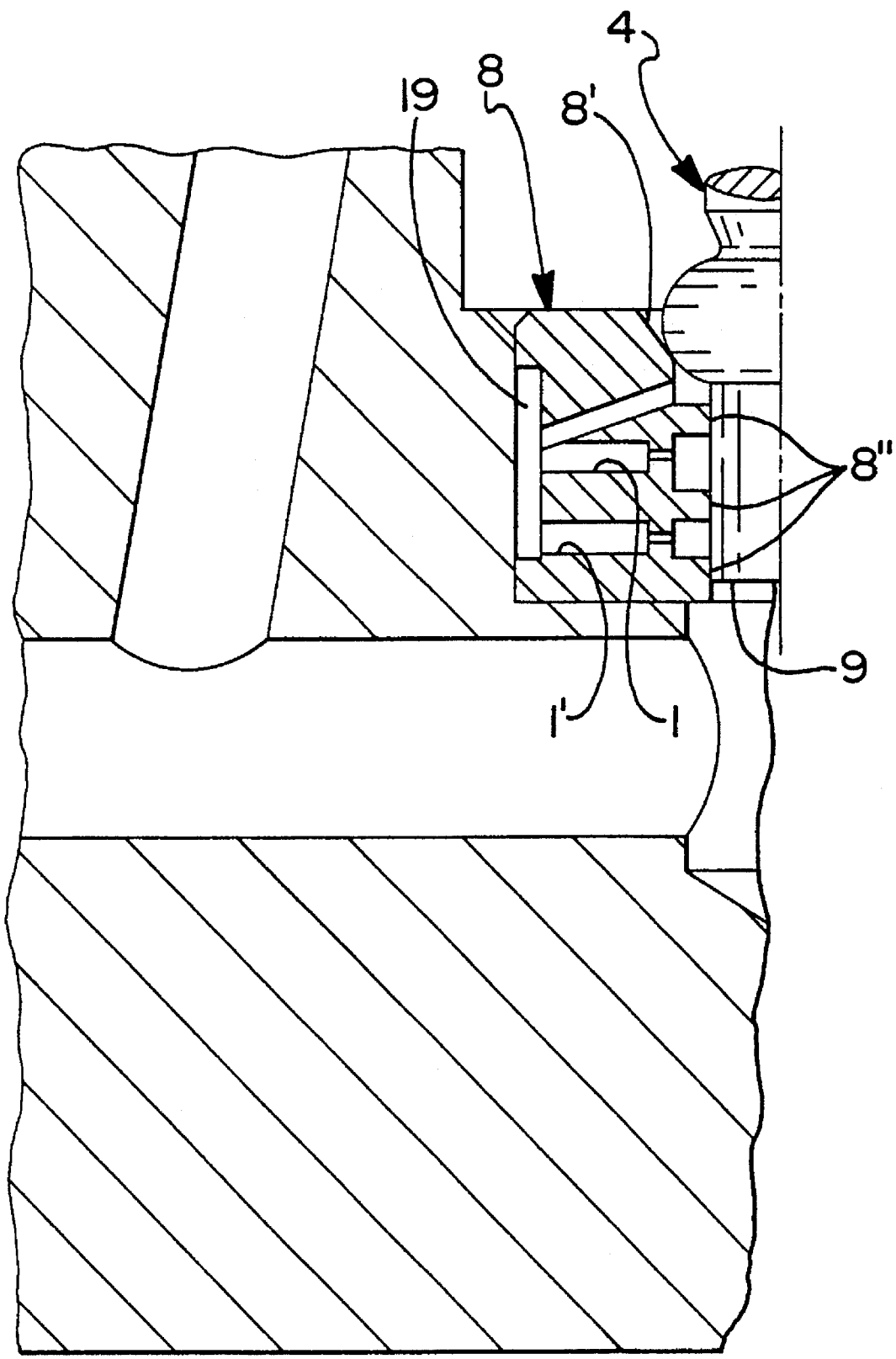
FIG. 2 shows an advantageous design version for the positioning of pressure agent transition ducts within a valve seat.

FIG. 2 shows an alternative design version for the positioning and for the configuration of the pressure agent transition ducts 1, 1' integrated in the valve seat 8. A plurality of pressure agent transition ducts 1, 1' which are disposed one above the other at a defined distance terminate in the hollow cylinder-shaped section of the valve seat 8. The pressure agent transition ducts 1, 1' are completely covered by the plunger piston 9 in the illustrated locking position of the plunger piston 9 being coupled to the valve-closing member 4. The hollow cylinder-shaped section of the valve seat 8 is succeeded by the funnel-shaped valve seat surface already known from FIG. 1 against which the spherical section of the valve-closing member 4 comes to be abutted. The residual components which are required for the actuation of the pressure control valve are identical to the design in FIG. 1, so that a repeated total illustration may be foregone and reference may be made to FIG. 1 in this regard.

The pressure agent transition ducts 1, 1' in FIG. 2 are provided with the orifices calibrating the flow rate, in analogy with FIG. 1. The annular groove 19 at the valve seat 8 constitutes a distributing chamber for the pressure agent which is being conveyed to the first pressure agent transition duct when the conical seat is open. From the annular groove 19 the pressure agent will then be distributed to the other two pressure agent transition ducts 1, 1' which are furnished with orifices and which end up, through the hollow cylinder-shaped section at the valve seat 8 being closable by the plunger piston 9, in the pressure agent connection 3 leading to the wheel brake.

According to FIG. 2, the valve-closing member 4 is in the electromagnetically fully energized closing position, so that all pressure agent transition ducts 1, 1' are closed. In the electromagnetically de-energized, open normal position of the valve, all pressure agent transition ducts 1, 1' are released by said valve-closing member, so that an unobstructed connection exists between the first and the second pressure agent connections 2, 3. As soon as the valve-closing member 4 initiates a stroke movement the pressure agent transition ducts 1, 1' (which end up in the hollow cylinder-shaped section of the valve seat 8) will be shut off one after the other (or sequentially) by the circumferential surface of the plunger piston acting as a slide valve. As a consequence of the restrictor effect, respectively of the orifice effect, a gradual, continuous, controlled reduction of the pressure agent flow will take place in the two pressure agent transition ducts 1, 1' until finally the pressure agent transition duct connecting the conical sealing seat to the annular groove 19 and being free of an orifice is separated, by the abutment of the spherical section of the valve-closing member 4 with the valve seat 8, from the second pressure agent connection 3 which is situated above said valve-closing member 4. As already mentioned, assuming a suitable proportional characteristic of the electromagnet, the stepwise opening of the pressure agent connection will allow the flow of pressure agent to be decisively influenced by controlling the armature current. A distinct improvement can be achieved as to the noise behavior which referred to the specific application for slip-controlled brake units in automotive vehicles will lead to a desirable increase of the comfort.

We claim:

1. A pressure control valve having a valve-closing member which is capable of adjusting a passage between a first pressure agent connection and at least one second pressure agent connection depending on its position, comprising:

a first pressure chamber and a second pressure chamber which are isolated from each other by sealing elements and are arranged directly one after the other between the first and the second pressure agent connections, a valve tappet extending through the sealing elements and a guide element, said sealing elements being arranged sealedly and radially movably on said guide element, the guide element having a bore for slidably receiving said valve tappet such that said tappet can move axially relative to said guide element, two pressure agent transition ducts provided in one of said first or second pressure chamber to form a variable cross-sectional area of a valve opening between said first and second pressure agent connections, a valve-supporting element arranged in series relative to a valve seat, said valve-closing member abutting a portion of one of said valve-supporting element or said valve seat at one end of an axial travel of said valve tappet and wherein said transition ducts are provided in one of said valve-supporting element or said valve seat, arranged in a cascaded axial arrangement such that axial movement of said valve-closing member sequentially opens or closes, depending on the direction of axial movement, said transition ducts to thereby allow pressure agent to be communicated between the first pressure agent connection and the second pressure agent connection.

2. A pressure control valve as claimed in claim 1, wherein said plurality of pressure agent transition ducts are defined through a portion of said valve-supporting element.

3. A pressure control valve as claimed in claim 1, wherein the pressure control valve is an electromagnetically controllable proportional valve including an electromagnetic armature that variably adjusts a stroke of the valve-closing member axial travel by a variation of a current within a coil in said electromagnetic armature.

4. A pressure control valve as claimed in claim 3, wherein said proportional valve is hydraulically pressure-balanced, and wherein a spring is arranged as a force counteracting the force of said electromagnetic armature.

5. A pressure control valve as claimed in claim 1, wherein said pressure agent transition ducts are distributed over a plurality of valve stroke sections and are directed toward the valve-closing member substantially at a right angle to the direction of said axial travel of said valve tappet.

6. A pressure control valve as claimed in claim 1, wherein said plurality of pressure agent transition ducts are defined through a portion of said valve seat.

7. A pressure control valve having a valve-closing member which is capable of adjusting a passage between a first pressure agent connection and at least one second pressure agent connection depending on its position, comprising:

a first pressure chamber and a second pressure chamber which are isolated from each other by sealing elements, a valve tappet extending through the sealing elements, said sealing elements being arranged sealedly and radially movably on a guide element, the guide element having a bore for slidably receiving the valve tappet, wherein said valve-closing member is furnished with a plunger piston having a generally spherical section that is guided so as to be abuttable against a valve seat, said generally spherical section of said valve-closing member having a larger diameter than said plunger piston, and a plurality of pressure transition ducts provided in said valve seat and being axially arranged such that axial movement of said plunger piston relative to said valve seat sequentially opens or closes said transition ducts, respectively, and wherein said generally spherical section closes off all of said transition ducts when said spherical section abuts against said valve seat.

8. A pressure control valve as claimed in claim 7, wherein said valve seat further comprises a first valve seat surface which is flared funnel-shaped and a cylindrical second slide valve sealing surface which is penetrated by said plurality of pressure agent transition ducts, which are in sequential axial alignment.

9. A pressure control valve as claimed in claim 7, wherein the pressure agent transition ducts are furnished with at least one of an orifice and a restrictor.

\* \* \* \* \*